United States Patent Office 2,698,833
Patented Jan. 4, 1955

2,698,833

DRILLING FLUID COMPOSITION AND METHOD

Doyne L. Wilson, Pasadena, Calif., assignor to Oil Base, Inc., Compton, Calif., a corporation of California No Drawing. Application August 25, 1952,
Serial No. 306,299

15 Claims. (Cl. 252—8.5)

This invention relates to the drilling of wells and has particular reference to drilling fluid compositions and methods for use of such compositions.

The rotary drilling of oil and gas wells requires the use of a drilling fluid or mud which consists of a suspension in a base of water or oil, or water and oil, of a material such as clays, calcium carbonate, etc. Additional weight materials, such as crushed oyster shells, barytes, galena, etc., are sometimes used. These drilling fluids perform the functions of lubricating the drilling bit, carrying the cuttings up to the surface, furnishing a static head to overcome formation pressures, and they form on the walls of the bore hole a substantially impervious sheath or filter cake to prevent the loss of fluid into the formation.

In the discovery of new oil reserves, it is necessary to drill exploratory or so-called "wildcat" wells in unproved areas. The oil potential of the area being drilled is determined by an analysis of cores and cuttings removed from the formation during the drilling operation. One widely used method of analysis is to expose a core section to ultraviolet light within the range of 2600–3700 Angstroms which will induce fluorescence in the sample if crude oil and/or distillate is present. Another method of analysis is to shake the core fragments or cuttings from the well hole with petroleum ether, carbon tetrachloride or a similar solvent. Any crude oil or distillate present in the sample is thus extracted and is recognized by fluorescence upon exposure to ultraviolet light and/or by its color or "cut."

It is readily apparent that contamination of the core or cuttings with oil, characterized by fluorescence and color, from an extraneous source would result in a positive test for fluorescence and a petroleum ether color or "cut." Since these tests are utilized by the core analyst and petroleum geologist in locating the potentially productive oil zones in a wildcat well, it is essential that the tests be thoroughly reliable, for erroneous conclusions from misleading data could result in costly testing in zones which are actually nonproductive.

Until recently, the drilling fluids most commonly used in wildcat wells were clay-water muds. The fluid lost from this type of mud is essentially water plus certain water-soluble ingredients which give negative tests for fluorescence and solvent color "cut" and hence do not lead to a masked or false analysis of cores and cuttings.

Emulsion type drilling fluids, wherein the fluid base comprises an oil-in-water emulsion, have become increasingly popular during recent years and have been widely used in the drilling of exploratory wells. While emulsion muds of the oil-in-water type are electrically conductive and hence permit the use of electrical logging in the same manner as with clay-water muds, and while emulsion muds are otherwise superior to clay-water muds in so far as actual drilling performance is concerned, a serious objection to their use has been raised by the core analysts and petroleum geologists. The crude oils and diesel oils used in such conventional emulsion muds fluoresce to such a degree, and they give such a pronounced "cut," that penetration of the cores and cuttings by some of the emulsion fluid makes it virtually impossible to evaluate the sample under study with any degree of certainty with respect to fluorescence and coloration. The situation is further complicated in that the emulsifiers heretofore used, such as, for example, tall oil soap, also fluoresce and lead to false readings. Accordingly, one of the principal advantages of this invention is to provide an emulsion type drilling fluid which is not subject to these disadvantages.

Another object of this invention is to provide an emulsion drilling fluid in which the oil component thereof is nonfluorescing, colorless and does not develop these properties under conditions of use.

A further object of this invention is to provide an emulsion drilling fluid having incorporated therein an emulsifier which does not fluoresce, is insoluble in oil and which imparts no color to oil.

Other objects and advantages of this invention it is believed will be readily apparent from the following detailed description of preferred embodiments thereof.

I have found that certain refined oils which contain a relatively low amount of aromatics and unsaturates are especially suitable for use as a component of oil-in-water emulsion drilling fluids. I have further found that while substantially all oils containing less than about 5% aromatics and unsaturates by volume, when utilized as the oil phase of an emulsion drilling fluid, exhibit negligible fluorescence on exposure to ultraviolet light, not all of such oils are suitable for use in such fluids since they exhibit color or "cut" at the elevated temperatures found in a well and in some cases at normal temperatures. Accordingly, in the selection of an oil for use in the drilling of wildcat wells, it is necessary to limit the selection to those oils which, in addition to having a low aromatics and unsaturates content, are thermally stable in so far as coloration is concerned. By the expression "thermally stable" or similar expressions is meant oils which evidence no appreciable discoloration through the formation therein of color bodies upon heating to at least 250° F.

Examples 1–8 below are illustrative of typical refined oils, taken from widely separated sources, which have been found to be suitable for use in drilling fluids in accordance with this invention. The most suitable oils are those which have been refined by the Edeleanu process to remove aromatics and unsaturates. As is well known to those skilled in the art, this process comprises solvent extraction of the kerosene with liquid sulfur dioxide, or a mixture thereof with benzene, usually followed by a clay treatment, the raffinate being the desirable fraction.

Example 1

| | |
|---|---|
| Source | California. |
| API gravity | 42°. |
| Flash point (P&M) | 126° F. |
| Sulfur | .02%. |
| Distillation: | |
|     Initial boiling point | 334° F. |
|     End point | 486° F. |
| Aniline point | 162° F. |
| Aromatics and unsaturates | 2%. |
| Color | +28 minimum-Saybolt (water white). |
| Fraction | Straight run. |
| Treatment | Edeleanu and clay. |
| Crude base | Asphaltic. |
| Fluorescence at 3660 Ångstroms | Negligible. |

Example 2

| | |
|---|---|
| Source | California. |
| API gravity | 40° |
| Flash point (P&M) | 125° F. |
| Sulfur | .01%. |
| Distillation: | |
|     Initial boiling point | 370° F. |
|     End point | 504° F. |
| Aniline point | 156° F. |
| Aromatics and unsaturates | 5%. |
| Color | 25 Saybolt (water white). |
| Fraction | Straight run. |
| Treatment | Edeleanu and clay. |
| Crude base | Asphaltic. |
| Fluorescence at 3660 Ångstroms | Negligible. |

Example 3

| | |
|---|---|
| Source | Oklahoma. |
| API gravity | 45.6°. |
| Flash point (P&M) | 144° F. |
| Sulfur | 0.6%. |
| Distillation: | |
| Initial boiling point | 365° F. |
| End point | 502° F. |
| Aniline point | 149° F. |
| Aromatics and unsaturates | <2%. |
| Color | 25 Saybolt (water white). |
| Fraction | Straight run. |
| Treatment | Edeleanu and clay. |
| Crude base | Naphthenic. |
| Fluorescence at 3660 Ångstroms | Negligible. |

Example 4

| | |
|---|---|
| Source | Pennsylvania. |
| API gravity | 47.7°. |
| Flash point (P&M) | 140° F. |
| Sulfur | 0.2%. |
| Distillation: | |
| Initial boiling point | 365° F. |
| End point | 485° F. |
| Aniline point | 163° F. |
| Aromatics and unsaturates | <2%. |
| Color | 25 Saybolt (water white). |
| Fraction | Straight run. |
| Treatment | Edeleanu and clay. |
| Crude base | Paraffinic. |
| Fluorescence at 3660 Ångstroms | Negligible. |

Example 5

| | |
|---|---|
| Source | Oklahoma. |
| API gravity | 42.3°. |
| Flash point (P&M) | 134.5° F. |
| Sulfur | 0.4%. |
| Distillation: | |
| Initial boiling point | 356° F. |
| End point | 513° F. |
| Aniline point | 147° F. |
| Aromatics and unsaturates | <2%. |
| Color | 25 Saybolt (water white). |
| Fraction | Straight run. |
| Treatment | Edeleanu and clay. |
| Crude base | Naphthenic. |
| Fluorescence at 3660 Ångstroms | Negligible. |

Example 6

| | |
|---|---|
| Source | Pennsylvania. |
| API gravity | 45.9°. |
| Flash point (P&M) | 128° F. |
| Sulfur | 0.2%. |
| Distillation: | |
| Initial boiling point | 364° F. |
| End point | 518° F. |
| Aniline point | 162° F. |
| Aromatics and unsaturates | <2%. |
| Color | 25 Saybolt (water white). |
| Fraction | Straight run. |
| Treatment | Edeleanu and clay. |
| Crude base | Paraffinic. |
| Fluorescence at 3660 Ångstroms | Negligible. |

Example 7

| | |
|---|---|
| Source | Pennsylvania. |
| API gravity | 44.6°. |
| Flash point (P&M) | 140° F. |
| Sulfur | 1%. |
| Distillation: | |
| Initial boiling point | 372° F. |
| End point | 536° F. |
| Aniline point | 148° F. |
| Aromatics and unsaturates | 2%. |
| Color | 25 Saybolt (water white). |
| Fraction | Straight run. |
| Treatment | Sulphuric acid. |
| Crude base | Paraffinic. |
| Fluorescence at 3660 Ångstroms | Negligible. |

Example 8

| | |
|---|---|
| Source | Louisiana. |
| API gravity | 43.4°. |
| Flash point (P&M) | 255° F. |
| Sulfur | Trace. |
| Distillation: | |
| Initial boiling point | 510° F. |
| End point | 644° F. |
| Aniline point | 160° F. |
| Aromatics and unsaturates | 2%. |
| Color | +19 Saybolt (water-white). |
| Fraction | Straight run. |
| Treatment | Sulphuric acid. |
| Crude base | Naphthenic-paraffinic. |
| Fluorescence at 3660 Ångstroms | Negligible. |

In carrying out this invention, it is preferred to prepare a concentrate composition comprising the nonfluorescing, nondiscoloring oil, water and a suitable emulsifier, which concentrate may be easily transported to the well site and there mixed with a clay-water mud to form the emulsion drilling fluid. A specific example of such a concentrate composition is as follows:

27.3 gals. oil (Example 1)
14.7 gals. water
25 lbs. emulsifier

The emulsifier used in the above example consisted of a powdered mixture of the following ingredients in the proportions by weight indicated: lignite 30%; sodium humate 30%; quebracho 40%. Such an emulsifier is especially suitable for use in connection with this invention since it does not fluoresce, is insoluble in the oil, and imparts no color to the oil. In practice, the proportions of lignite and sodium humate may vary from 0–30% and from 30–60%, respectively. Other nonfluorescing, nondiscoloring (i. e., thermally stable) emulsifiers which have been found suitable for use in compositions in accordance with this invention are, for example: "Nonic," a polyethylene glycol tert-dodecyl thioether manufactured by Sharples Chemical Co.; Sorbitan Monooleate, manufactured by Atlas Powder Co.; "Alkaterge O" and "Alkaterge C," amine type compounds, each being a substituted oxazoline having a molecular and equivalent weight of 350, manufactured by Commercial Solvents Corporation.

In preparing the concentrate composition of the above example, the emulsifier is added to the water with mechanical agitation, followed by the oil. Agitation is continued until a smooth, homogeneous emulsion is obtained. From a standpoint of commercial practicability, the oil content may vary from 50–65% by volume, and the water from 35–50%. The emulsifier may vary from 20–30 pounds per barrel (42 gallons) of oil-water mixture.

Nonfluorescing, noncutting emulsion drilling fluids have been prepared by adding about one barrel of the liquid concentrate described above to five barrels of clay-water mud and agitating with mud guns to obtain a smooth mixture of slightly more than six barrels of fluid. From a commercially practicable standpoint, the ratio of concentrate to clay-water mud may vary from 1:4 to 1:7 on a volume basis. It will be apparent that the concentrate may be added to clay-water muds already in use in the well hole, or to freshly prepared clay-water muds. It is also readily apparent that, where desirable, the oil and the emulsifier may be added separately to the clay-water mud at the well site. Additionally, it should be pointed out that the nonfluorescing, nondiscoloring oils of this invention have found utility quite apart from the emulsifiers disclosed herein. For example, such oils are added alone to previously prepared emulsion fluids to increase the oil concentration. In some cases, depending upon conditions found in the well hole, no emulsifier is necessary to produce a suitable emulsion fluid. Oils of the type disclosed herein are also used, either alone or in an emulsion drilling fluid, as a "pill" to free stuck pipe.

Examples of nonfluorescing, noncutting emulsion drilling fluids were prepared in the laboratory, with and without the concentrate composition dicslosed above, and tested for fluorescence, "cut," and fluid loss. The results are summarized in the following table:

| Example | Base Mud, 350 cc. | Concentrate Composition, cc. | Additives | Fluid Loss cc. | Fluid Loss Min. | Fluorescence at 3,660 Angstroms | CCl₄ Cut |
|---|---|---|---|---|---|---|---|
| 1 | Sat'd. brine/clay | 0 | 0 | 160 | 5 | Negative | Negative. |
| 2 | ----do---- | 87.5 | {Caustic, 5 g. / Starch, 5 g.} | 5.6 | 30 | ----do---- | Do. |
| 3 | Gulf Coast C/W hole mud | 0 | 0 | 17.4 | 30 | ----do---- | Do. |
| 4 | ----do---- | 87.5 | 0 | 2.7 | 30 | ----do---- | Do. |
| 5 | West Coast C/W hole mud | 0 | 0 | 12.2 | 30 | ----do---- | Do. |
| 6 | ----do---- | 87.5 | 0 | 2.4 | 30 | ----do---- | Do. |

While the particular examples of the invention herein described are well adapted to carry out the objects of the invention, various modifications and changes may be made and this invention is of the scope set forth in the appended claims.

I claim:

1. An emulsion drilling fluid wherein the oil phase thereof comprises a nonfluorescing mineral oil that is thermally stable against appreciable discoloration through the formation therein of color bodies when heated under conditions of use, said oil having an aromatics and unsaturates content of less than about 5%.

2. An emulsion drilling fluid wherein the oil phase thereof comprises a nonfluorescing mineral oil that is thermally stable against appreciable discoloration through the formation therein of color bodies when heated under conditions of use, said oil comprising the raffinate from the Edeleanu process and having an aromatics and unsaturates content of less than about 5%.

3. A concentrate for addition to a clay-water drilling fluid, said concentrate comprising an oil-in-water emulsion including a nonfluorescing mineral oil that is thermally stable against appreciable discoloration through the formation therein of color bodies when heated under conditions of use, said oil having an aromatics and unsaturates content of less than about 5%, water, and a nonfluorescing, nondiscoloring emulsifier, said emulsifier being insoluble in said mineral oil.

4. A concentrate for addition to a clay-water drilling fluid, said concentrate comprising an oil-in-water emulsion including a nonfluorescing mineral oil that is thermally stable against appreciable discoloration through the formation therein of color bodies when heated under conditions of use, said mineral oil comprising the raffinate from the Edeleanu process and having an aromatics and unsaturates content of less than about 5%, water, and a nonfluorescing, nondiscoloring emulsifier, said emulsifier being insoluble in said mineral oil.

5. A concentrate for addition to a clay-water drilling fluid, said concentrate consisting of an oil-in-water emulsion comprising from about 50 to about 65% of a nonfluorescing mineral oil that is thermally stable against appreciable discoloration through the formation therein of color bodies when heated under conditions of use, said oil having an aromatics and unsaturates content of less than about 5%, from about 35 to about 50% water, and a substantial proportion of an emulsifier.

6. A well drilling fluid comprising clay, water, and an oil phase consisting essentially of a nonfluorescing mineral oil that is thermally stable against appreciable discoloration through the formation therein of color bodies when heated under conditions of use, said oil having an aromatics and unsaturates content of less than about 5%.

7. A well drilling fluid comprising clay, water, an oil phase consisting essentially of a nonfluorescing mineral oil that is thermally stable against appreciable discoloration through the formation therein of color bodies when heated under conditions of use, said oil having an aromatics and unsaturates content of less than about 5%, and a nonfluorescing, nondiscoloring emulsifier, said emulsifier being insoluble in said mineral oil.

8. A well drilling fluid comprising about one part of a concentrate as set forth in claim 3, and from about four parts to about seven parts of a clay-water mud.

9. A well drilling fluid comprising about one part of a concentrate as set forth in claim 4, and from about four parts to about seven parts of a clay-water mud.

10. An emulsion drilling fluid wherein the oil phase thereof comprises a mineral oil that is thermally stable against appreciable discoloration through the formation therein of color bodies when heated under conditions of use, said oil containing less than about 5% aromatics and unsaturates which exhibit appreciable fluorescence when exposed to ultra-violet light within the range of 2600–3700 Ångstroms.

11. A concentrate for addition to a clay-water drilling fluid, said concentrate comprising an oil-in-water emulsion including a mineral oil that is thermally stable against the formation therein of color bodies when heated under conditions of use, said oil containing less than about 5% aromatics and unsaturates which exhibit appreciable fluorescence when exposed to ultra-violet light within the range of 2600–3700 Ångstroms, and a non-fluorescing, non-discoloring emulsifier, said emulsifier being insoluble in said mineral oil.

12. The method of determining the oil potential of a formation through which a well is being drilled with well drilling tools, comprising: admixing with a drilling mud containing colloidal particles of clayey material suspended in sufficient water to render the same circulatable, a non-fluorescing mineral oil that is thermally stable against appreciable discoloration through the formation therein of color bodies when heated under conditions of use, said oil having an aromatics and unsaturates content of less than about 5% and forming an oil-in-water emulsion with said water; circulating the resulting drilling fluid through the well in contact with the cuttings and/or core produced by said drilling tools; and making an analysis of the cuttings and/or core to determine the presence therein of crude oil and/or distillate.

13. The method of determining the oil potential of a formation through which a well is being drilled with well drilling tools, comprising: admixing with a drilling mud containing colloidal particles of clayey material suspended in sufficient water to render the same circulatable, a mineral oil that is thermally stable against appreciable discoloration through the formation therein of color bodies when heated under conditions of use, said mineral oil containing less than about 5% aromatics and unsaturates which exhibit appreciable fluorescence when exposed to ultra-violet light within the range of 2600–3700 Ångstroms and forming an oil-in-water emulsion with said water; circulating the resulting drilling fluid through the well in contact with the cuttings and/or core produced by said drilling tools; and making an analysis of the cuttings and/or core to determine the presence therein of crude oil and/or distillate.

14. The method of determining the oil potential of a formation through which a well is being drilled with well drilling tools, comprising: admixing with a drilling mud containing colloidal particles of clayey material suspended in sufficient water to render the same circulatable, a concentrate comprising a non-fluorescing, non-discoloring emulsifier and a non-fluorescing mineral oil that is thermally stable against appreciable discoloration through the formation therein of color bodies when heated under conditions of use, said mineral oil containing less than about 5% aromatics and unsaturates which exhibit fluorescence when exposed to ultra-violet light within the range of 2600–3700 Angstroms, said emulsifier being insoluble in said mineral oil and forming an oil-in-water emulsion between said oil and said water; circulating the resulting drilling fluid through the well in contact with the cuttings and/or core produced by said drilling tools; and making an analysis of the cuttings and/or core to determine the presence therein of crude oil and/or distillate.

15. The method defined in claim 14, in which the concentrate is added in proportions of one part thereof for each four to seven parts of the clay-water mud by volume.

References Cited in the file of this patent

UNITED STATES PATENTS

| | | |
|---|---|---|
| 2,476,845 | Dawson | July 19, 1949 |
| 2,488,304 | Malott | Nov. 15, 1949 |
| 2,531,662 | Beck | Nov. 28, 1950 |
| 2,578,888 | Kaveler | Dec. 18, 1951 |
| 2,582,323 | Fischer | Jan. 15, 1952 |

OTHER REFERENCES

Drug and Cosmetic Emulsions, pub. 1947 by Atlas Powder Co. of Wilmington, Delaware, pages 20 and 21.